United States Patent [19]

Maurer et al.

[11] Patent Number: 4,637,244
[45] Date of Patent: Jan. 20, 1987

[54] METER PROVERS

[76] Inventors: Robert Maurér, 31A The Avenue, Cowley, Uxbridge, Middlesex; Peter C. Epstein, 8A Fitzroy Park, Highgate, London N6 6HP, both of England

[21] Appl. No.: 634,098
[22] PCT Filed: Nov. 28, 1983
[86] PCT No.: PCT/GB83/00306
§ 371 Date: Jul. 23, 1984
§ 102(e) Date: Jul. 23, 1984
[87] PCT Pub. No.: WO84/02185
PCT Pub. Date: Jun. 7, 1984

[30] Foreign Application Priority Data

Nov. 26, 1982 [GB] United Kingdom ............... 8233714
May 3, 1983 [GB] United Kingdom ............... 8312078

[51] Int. Cl.$^4$ ............................................. G01F 25/00
[52] U.S. Cl. ............................................................ 73/3
[58] Field of Search ........................... 73/3, 1 G, 1 H

[56] References Cited

U.S. PATENT DOCUMENTS

| Re. 31,432 | 11/1983 | Fransisco, Jr. ............... | 73/3 |
| 3,098,382 | 7/1963 | Hoffman et al. ............. | 73/3 X |
| 3,768,510 | 10/1973 | Reves ........................... | 73/3 |
| 4,307,601 | 12/1981 | Jackson ........................ | 73/3 |
| 4,372,147 | 2/1983 | Waugh et al. ................ | 73/3 |
| 4,507,952 | 4/1985 | Mathieu ........................ | 73/3 |
| 4,549,426 | 10/1985 | Erickson ...................... | 73/3 |

FOREIGN PATENT DOCUMENTS

| 2471590 | 6/1981 | France ........................... | 73/3 |
| 2481449 | 10/1981 | France ........................... | 73/3 |
| 2825 | 8/1983 | PCT Int'l Appl. ............ | 73/3 |
| 1038287 | 8/1966 | United Kingdom .......... | 73/3 |
| 2088566 | 6/1982 | United Kingdom .......... | 73/3 |
| 2129569 | 5/1984 | United Kingdom .......... | 73/3 |

Primary Examiner—Stewart J. Levy
Assistant Examiner—Tom Noland
Attorney, Agent, or Firm—Louis Orenbuch

[57] ABSTRACT

A meter prover employs a piston arranged to slide in a bore within a proving cylinder which is coaxially disposed within a surrounding cylindrical shell. The effective area of the upstream face of the piston which can be acted on by fluid pressure is less than the effective area of the downstream face of the piston. In a proving run, fluid flow to the meter to be proved is diverted to an inlet in the shell upon closure of a bypass valve. The diverted fluid then flows through an annular space between the proving cylinder and the shell, enters the upstream end of the bore through openings in the cylinder, and drives the piston downstream along the cylinder in synchronism with the flow. Upon reopening of the bypass valve, equal fluid pressures act on the upstream and downstream faces of the piston and the difference in effective area of those faces causes the piston to return to the position it had at the start of the proving run.

9 Claims, 8 Drawing Figures

Fig. 3
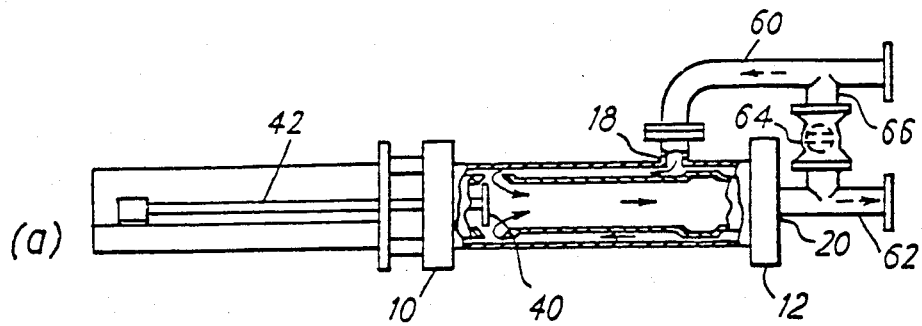
(a)
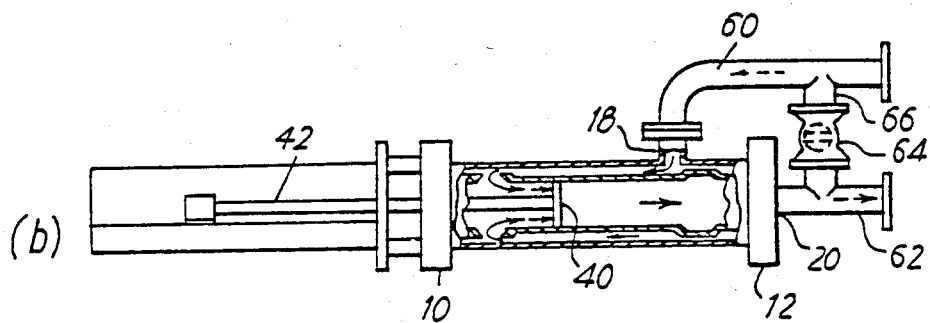
(b)
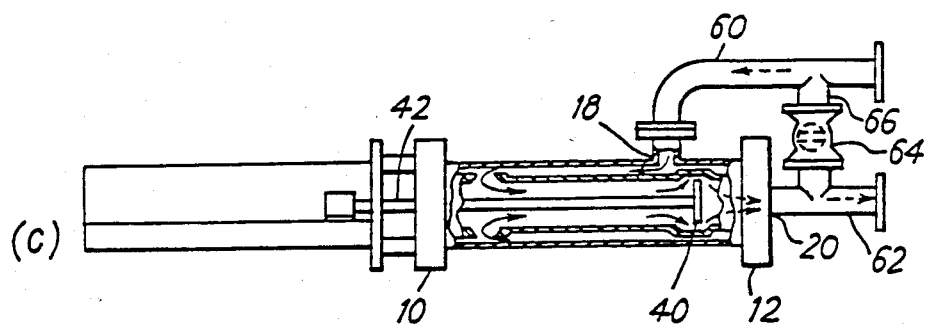
(c)
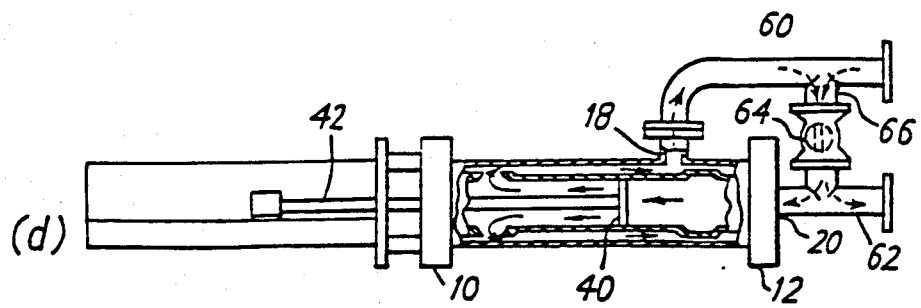
(d)

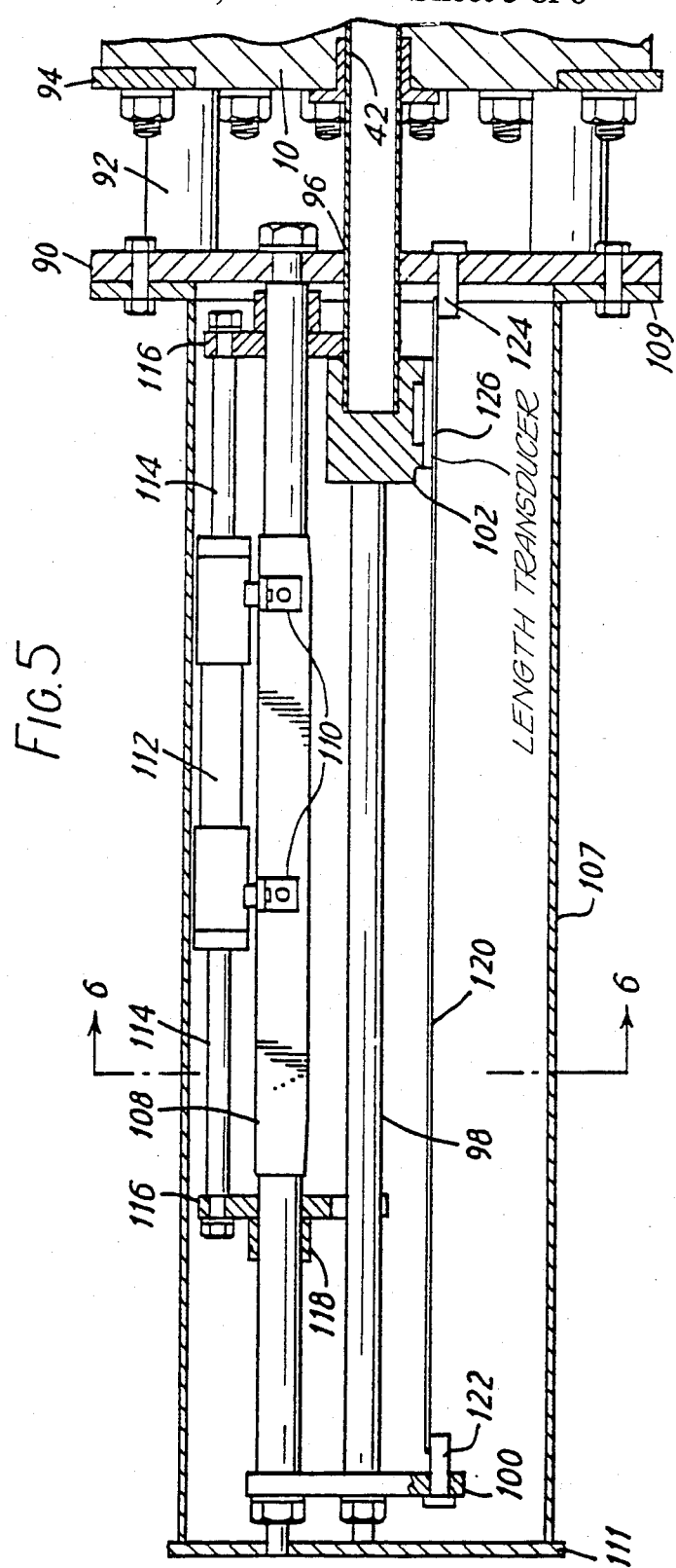

METER PROVERS

FIELD OF THE INVENTION

This invention relates to meter provers for use, for example, in proving rotary flow meters of the type producing an electrical output pulse per increment of rotation. The number of pulses per unit volume is a characteristic of the meter which is defined as the k factor and it is the purpose of the prover to enable calibration of the meter k factor. A principal application is the measurement of oil flow rates and it is here a requirement for the meter k factor to be determined to an accuracy of at least 0.02%.

BACKGROUND OF THE INVENTION

The conventional form of meter prover utilised the passage of a sphere along an accurately dimensioned pipe between fixed detectors to displace a known volume of fluid. The volume of fluid displaced by the prover passes in series through the meter to be proved and the number of pulses generated in the meter during the passage of the sphere between the detectors is counted to enable determination of the k factor. To achieve the necessary high accuracy, a large displaced volume is essential and provers of 20 meters in length were not uncommon. Provers of this size are clearly impractical on oil rigs and other confined spaces and efforts have therefore been made to develop so called compact provers. By increasing the inherent accuracy of the proving operation with the use of electrical pulse handling techniques, it has been possible to reduce the displaced volume necessary for the desired 0.02% accuracy and meter provers have been produced in the form of a piston and cylinder having a stroke in the order of one meter.

With meter provers of the piston type, the difficulty is encountered of how to restore the piston to its start position after the end of a proving stroke. Various mechanisms have been suggested for this purpose including cable and winch arrangements (such as for example shown in FR No. 2 471 590) or separate retraction pistons operating on compressed gas (see for example GB No. 2 023 295). Any such additional retraction mechanism requires to be carefully controlled so as to offer no impedance whatever to the proving stroke but to restore the piston fully and reliably to its start position in time for the next proving stroke. These meter provers have therefore been relatively expensive. Moreover, the retraction mechanism represents a further source of possible malfunction or breakdown.

Other meter provers restore the piston by reversing the flow through the cylinder, thus offering the possibility of proving in both directions movement of the piston. Provers of this sort are referred to as bidirectional in contrast to the unidirectional provers with separate retraction mechanisms described above. If a bidirectional prover is to be connected in line with a working meter, it is necessary to provide a four way valve such that flow can be directed in opposite senses through the prover and in a by-pass mode around the prover. Care must be taken to monitor any possible leakage in such four way valves using, for example, block and bleed techniques. Four way valves with block and bleed facilities are, however, relatively expensive. There is a further difficulty associated with bidirectional provers, namely that the detection, control and processing systems have to be capable of dealing with proving strokes in two opposite directions. This invariably adds to the complexity and cost of the prover.

OBJECT OF THE INVENTION

It is an object of this invention to provide a meter prover which is compact, reliable and relatively inexpensive.

The present invention consists in a meter prover for proving a meter connected in a fluid flow path, comprising a proving bore; a piston movable along said bore in sealed engagement therewith; means for connecting the proving bore in parallel with a section of said flow path not containing the meter and bypass valve means operable to cause flow selectively through the proving bore or through said parallel flow path section, the piston moving in a proving run in synchronism with flow along the proving bore to establish a known displaced volume, characterised in that the effective area of the piston on the upstream face thereof is less than the effective area on the downstream face so that on commencement of flow through said parallel flow path section after a proving run, substantially equal fluid pressure acting on opposite faces of the piston effects retraction thereof in a direction upstream.

Advantageously, the proving bore is defined by a proving cylinder lying within a hollow cylindrical shell, the cylinder and shell being interconnected only at opposite axial extremes of the proving bore.

Preferably, the proving cylinder is formed with fluid inlet means and fluid outlet means adjacent respective opposite ends thereof, the shell being formed with fluid inlet means at an end thereof remote from the cylinder inlet means so that fluid flow through the prover passes along an annular gap between the shell and cylinder before entering the proving bore. In this way, the exterior of the proving bore is exposed only to fluid and not to the surroundings which may be at a different temperature. Moreover, the proving cylinder is not subjected to large differential fluid pressures and the necessary dimensional stability can be achieved with a less substantial structure.

It is a general disadvantage of the piston type of prover that should jamming of the piston occur, the resulting fluid pressure transients might cause severe damage both to the prover and to the associated pipe work. If a relief valve were to be provided in series with the meter prover, it would have—for the elimination of leaks—to be produced to the same tolerances as the prover itself. Moreover, separate procedures would have to be instituted to monitor leaks developing in use. Such a relief valve would accordingly be expensive to produce and would add further complications to the proving operation. It is therefore a further object of one aspect of this invention to provide an improved meter prover which affords protection against the harmful consequences of the piston jamming, without undue complication of the normal proving operation.

Accordingly, the present invention consists in a further aspect in a meter prover comprising a cylinder having a proving bore and a piston mounted in the cylinder for movement along the bore in sealed engagement therewith, characterised in that the piston is formed in radially inner and outer parts which are separable in the axial direction, said separating movement being normally restrained by at least one element which is adapted to undergo permanent deformation or fracture in the event of fluid forces on the piston exceeding a predetermined threshold. Suitably, said element comprises a radially disposed shear pin.

With a meter prover according to this preferred form of the invention, any increase in fluid pressure caused by jamming of the piston would result in shearing of the pin or pins holding the two piston parts together so enabling the radially inner piston part to move with the flow away from the jammed outer part. Fluid will then flow through the radially outer part of the piston so preventing the fluid pressure from rising to harmful levels.

BRIEF DESCRIPTION OF THE DRAWINGS

FIG. 5 is a sectional elevation of a further part of the meter prover shown in FIG. 1; the parts shown in FIGS. 1 and 5 being axially contiguous.

DETAILED DESCRIPTION OF THE PREFERRED EMBODIMENT

Figure 1:
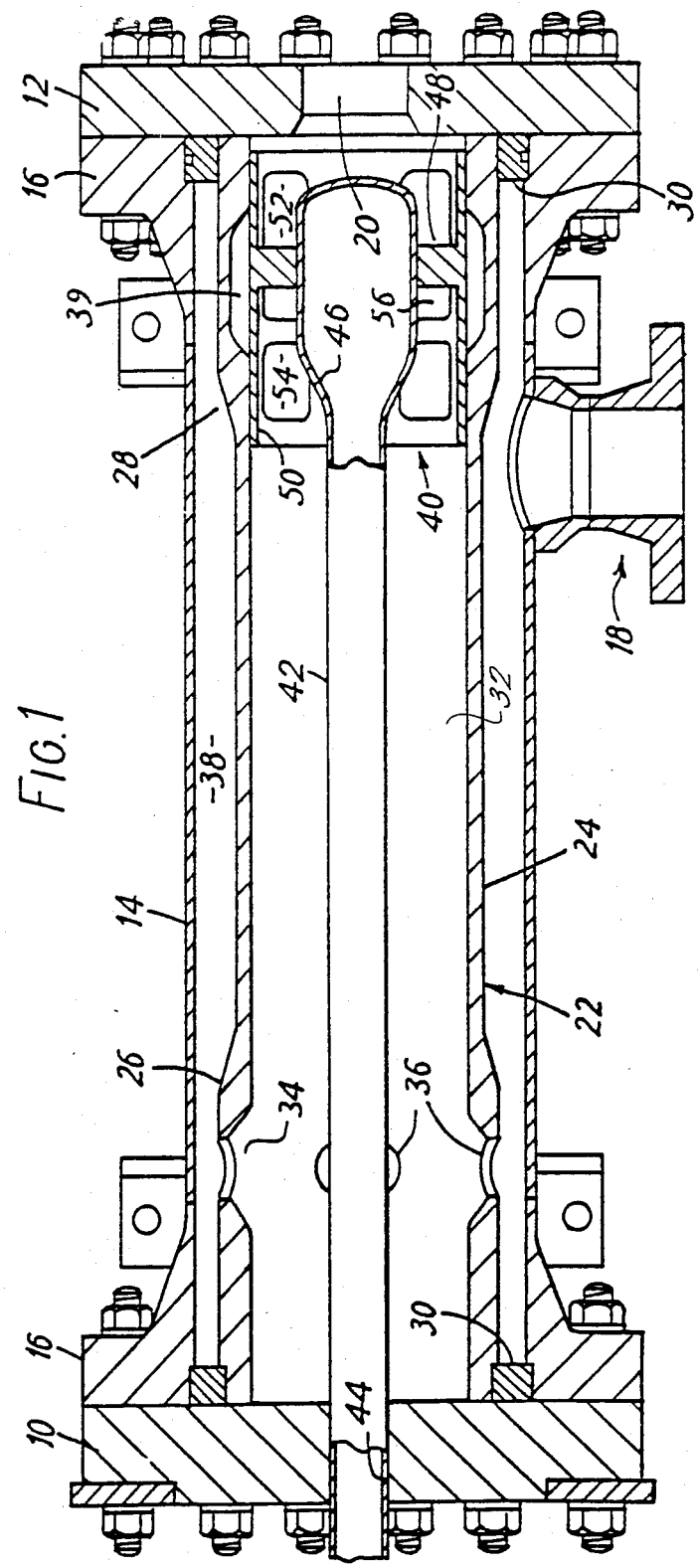
FIG. 1 is a sectional elevation of part of the meter prover according to this invention.

Referring to FIG. 1 of the drawings, the meter prover comprises two end plates 10 and 12 between which extends a generally cylindrical shell 14. The shell 14 has integral flange ends 16 which are of the same diameter as the end plates and which are secured to the respective end plates with a series of bolts spaced equiangularly around the periphery. The shell 14 has a fluid inlet port 18 at a location close to the end plate 12. Within this end plate 12, there is a central aperture 20 serving as a fluid outlet port.

Coaxially mounted within the shell 14 is a proving cylinder 22 having a central section 24 of constant wall thickness and shaped upstream and downstrean end portions 26 and 28 respectively. This cylinder abuts the two end plates and is located radially by means of two locating rings 30 provided one at each end. The central section 24 of the cylinder defines an internal proving bore 32.

Figure 2:
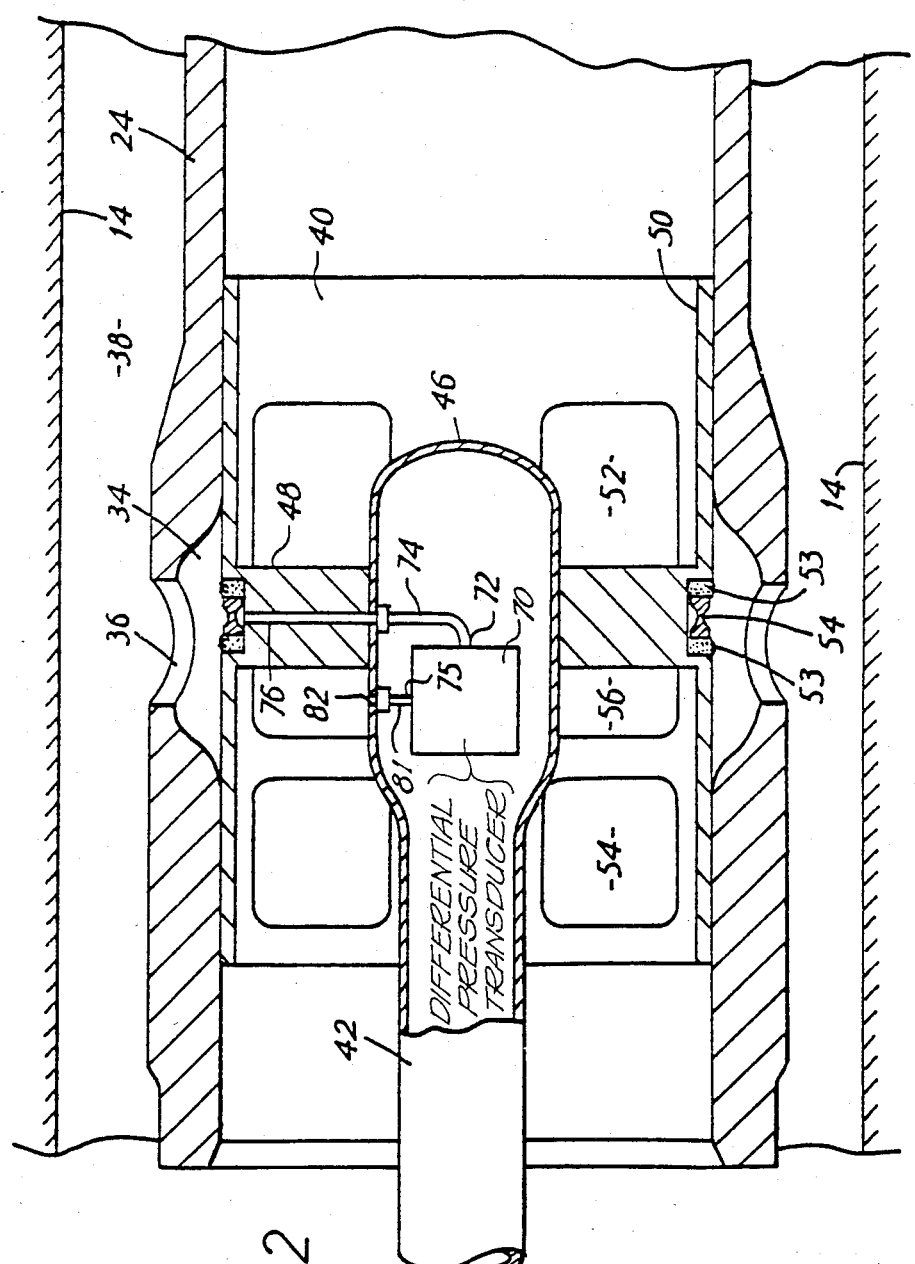
FIG. 2 is a detail view of part of FIG. 1, FIGS. 3(a) to (d) are diagrams showing the installation and operation of the described meter prover.

The upstream end portion 26 has an interior circumferential groove defining a bypass chamber 34 which is illustrated to a larger scale in FIG. 2. Four apertures 36 equally spaced around the circumference of the cylinder end portion 26 communicate between the bypass chamber 34 and the annular gap 38 between the shell 14 and the cylinder central section 24. The opposite end portion 28 is formed with an interior circumferential groove of generally regular form providing a downstream bypass chamber 39.

A piston 40 is mounted for sliding movement along the cylinder and has a piston rod 42 of hollow cylindrical form extending through a central aperture 44 of the end plate 10. The piston, shown in more detail in FIG. 2, comprises a bulbous piston rod head 46 formed with an outer collar 48 supporting a cylindrical piston wall 50 which is coaxial with the piston rod. Downstream of the collar 48 (that is to say to the right in FIG. 1) the piston wall is provided with a series of four apertures 52 spaced equally about the circumference thereof. Upstream of the collar 48 the piston wall has two further series of four apertures; the apertures 54 remote from the collar being of the same dimensions as apertures 52 and the apertures 56 adjacent the collar being of a reduced axial dimension. As seen best in FIGS. 2 and 4, the piston wall 50 is formed with an annular recess 51 opposite the location of the supporting collar 48. Inside this recess are positioned two O-ring seals 53, a central seal spacer 54 of generally dumb-bell shaped section ensuring that the two seals are maintained at opposite extremities of the recess.

In operation, the prover is connected as shown in FIG. 3. The flow line is connected to the shell inlet port 18 through pipe work 60. Return pipe work 62 connects the fluid outlet 20 with the meter to be proved and a valve 64 is positioned in a bypass 66 between pipework 60 and return pipe work 62. If appropriate in particular circumstances, the prover may be arranged downstream rather than upstream of the meter to be proved. During normal working, the valve 64 is open and the piston is in the start position shown in FIG. 3. The flow resistance offered by the open valve is less than that of the prover so that flow will pass through the valve, although the prover will contain fluid at the line pressure and line temperature. At the start of a proving operation, the valve 64 is closed, as shown in FIG. 3a, causing fluid to divert through inlet port 18; along the annular gap between the shell 14 and the proving cylinder 22; through the apertures 36 and into the bypass chamber 34. In the start position of the piston shown in FIGS. 2 and 3a, the piston sealing rings 53 lie within the bypass chamber 34 so that fluid is free to pass through the piston wall apertures 52, along the proving bore 32 and through the fluid outlet port 20. After steady state conditions have been achieved, the piston is nudged (as will be described) in a direction toward the proving bore 32 taking the piston seals 53 out of the bypass chamber 34 and into engagement with the proving bore as shown in FIG. 3b. Once this engagement is made, the piston will travel along the proving bore in synchronism with fluid flow through the prover.

During this proving stroke, the output impulses from the meter to be proved are compared with the changing position of the piston as measured by detectors on the free end of the piston rod which will be described later.

At the completion of the proving stroke, shown in FIG. 3c, the piston sealing rings 53 enter the downstream bypass chamber 39, so enabling immediate fluid flow through the relatively narrow piston wall apertures 56 to the bypass chamber. After further slight movement, flow is also enabled through the larger apertures 54. In this way, the increased fluid pressure upstream of the piston is smoothly reduced and the piston comes to rest. The design of the piston and piston rod in generally hollow form is such that the mass of the piston/piston rod assembly is low and not greatly different from the volume of fluid displaced. This means that the inertia of the piston is relatively low and the piston can be brought to rest quickly.

To complete the sequence of proving operations, the valve 64 is opened with the effect that fluid pressure at the prover inlet and outlets is equalised. The piston is nudged to the left (as shown in FIG. 1) until the seals 53 re-enter the proving bore. It will be recognised that the effective area of the downstream (with respect to the direction of flow in the proving stroke) face of the piston exceeds that of the upstream face by a margin corresponding to the cross sectional area of the piston rod.

With equal fluid pressure on either side of the piston, this inequality of effective area results in movement of the piston in the upstream direction. (See FIG. 3d). The retracting movement of the piston will continue, expelling fluid contained in the cylinder to the left of the piston, until the piston reaches the start position shown in FIG. 3.

By this means, retraction of the piston is achieved automatically and with no separate retraction mechanism which would add costs and introduce a further potential cause of malfunction or breakdown.

Further aspects of the apparatus according to a preferred form of this invention will now be described.

Figure 4:
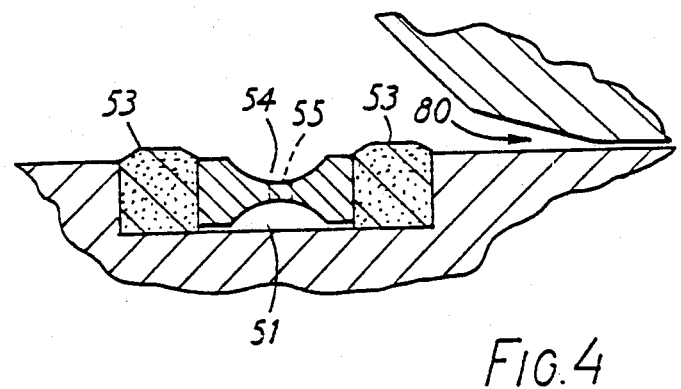
FIG. 4 is a scrap view to an enlarged scale of part of FIG. 2.

In order to ensure that there is no leakage past the piston seals 53 a block and bleed technique is employed. It has previously been suggested (see for example FR No. 2 481 449) that the fluid pressure in the annular space between piston sealing rings should be monitored to detect leaks. This has involved, however, detecting changes which are very small in comparison with the absolute pressure measured and the limit of fluid leakages that known arrangements can detect is capable of improvement. To this end, and with particular reference to FIG. 2, the piston rod head 46 contains a differential fluid pressure transducer 70 having a first input 72 connected through tube 74 with a radial bore 76 which extends through the collar 48 and opens into the piston wall recess 51. The above described seal spacer 54 has a series of radial apertures 55 (shown in FIG. 4) providing communication between this radial bore 76 and the volume between the piston seals. A second inlet 75 of the pressure transducer is connected through tube 81 with a small aperture 82 in the piston rod head upstream of the collar 48. In this way, the pressure transducer is capable of measuring a differential pressure between the fluid in the proving bore upstream of the piston and the fluid contained between the two sealing rings. In order to ensure that the latter fluid is at a pressure measuably in excess of the pressure in the proving bore, the bypass chamber 34 is provided as shown in FIG. 4 with a slight chamfer 80 leading into the proving bore itself. On commencement of a proving run, the first of the piston rings 53 enters the chamfer 80 and is compressed to its sealing configuration. At a finite interval thereafter, the second piston ring, still in its relaxed state, makes preliminary engagement with the chamfer and effectively traps a volume of fluid between the two sealing rings. Further movement of the piston takes the second piston ring through the chamfer effecting radial compression of the second sealing ring. The fluid originally trapped in the chamfer has now to occupy a volume of reduced radial dimension. The piston sealing rings have an inherent elasticity and will each be slightly deformed in the axially outward direction by this trapped fluid which will itself undergo some slight compression. These phenomena lead to an increased pressure sensed at the first inlet of the differential pressure transducer. In this way, very small absolute changes in fluid pressure between the sealing rings becomes measurable so reducing further the limit of fluid leakage that can be detected.

Figure 6:
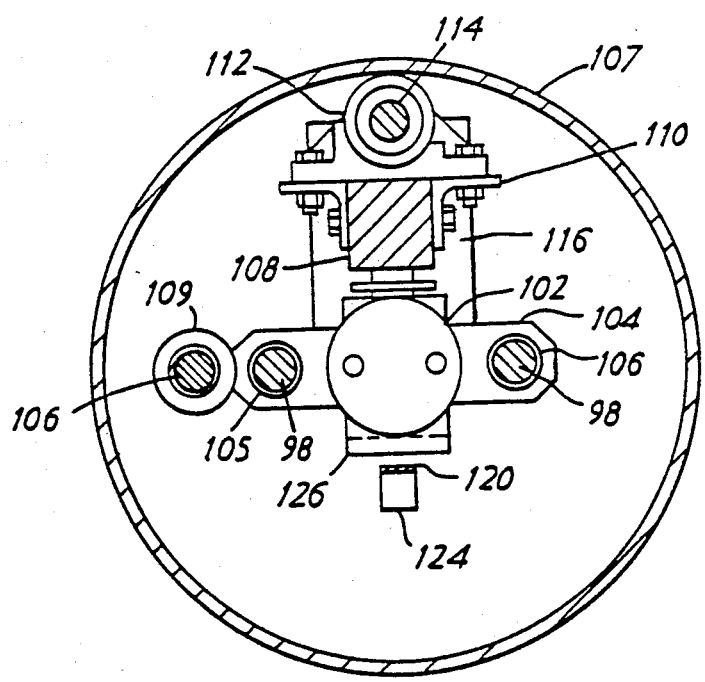
FIG. 6 is a section on 6—6 of FIG. 5.

With reference to FIGS. 5 and 6 there will now be described a mechanism for nudging the piston into the proving bore and means for detecting the position of the piston. A support disc 90 is mounted on four equiangularly spaced pillars 92 which are parallel with the axis of the proving cylinder and which are secured at their respective opposite ends to an annular plate 94 bolted in turn to the end plate 10 of the proving shell. The support disc 90 has a central aperture 96 through which the piston rod extends and is slidably supported. Two solid guide rods 98 extend from the support disc 90, one on each side of the piston rod, and are joined at their free ends by tie plate 100. A carriage 102 is secured rigidly to the free end of the piston rod and has two laterally extending wings 104. Each wing 104 is formed with an aperture 105 through which the corresponding guide rod 98 extends so that the carriage is free to slide along the guide rods. A cylindrical cover 107 is mounted through integral flange 109 to the support disc 90 and extends over the length of the guide rods terminating in cover plate 111.

In addition to the guide rods 98, there extend between the support disc 90 and tie plate 100 a lead screw 106 and a nudge cylinder support bar 108 of square cross section. The lead screw 106 is freely rotatably mounted and a bush 109 mounted on one lateral wing of the carriage 102 may selectively be brought into threaded engagement with the lead screw. In the normal, disengaged position, the bush 109 slides freely relative to the lead screw 106. In the engaged position, the carriage, piston rod and piston may be driven manually along the proving bore by rotation of the lead screw. This enables calibration of the prover in the field.

Intermediate its length, the nudge cylinder mounting bar 108 carries four brackets 110 (two only of which are seen in FIG. 5) to which are mounted a double acting nudge cylinder 112. Nudge piston rods 114 extend in opposite directions from the nudge cylinder 112, each rod terminating at a nudge finger 116 mounted—through an integral bearing sleeve 118—for sliding movement along the mounting bar 108. Beneath the bar 108, each nudge finger is shaped as a yoke for engagement with the carriage 102.

It will be seen that with the proving piston in its start position, the carriage 102 will be engaged with left hand nudge finger 116. Actuation of the nudge cylinder causing the piston rods thereof to move to the right, will thus be effective to launch the piston on a proving run. At the end of the proving run, the carriage will come into engagement with right hand nudge finger and the nudge cylinder is preferably arranged to apply a decelerating force through the carriage to the piston. With the bypass valve moved to the open position, actuation of the nudge cylinder to move the piston rods thereof to the left, will bring the piston into the proving bore, enabling the unbalanced fluid forces to effect retraction of the piston as described above.

Beneath the guide rods 98, and parallel to them, a linear measurement tape 120 extends between anchorage points 122 and 124 in the tie plate 100 and support disc 90, respectively. This tape is of well known form and contains magnetic markings which can be detected by a length transducer 126 mounted on the carriage 102 so as to overlie the tape. Signals from this length transducer can be interpreted to define the axial position of the piston at any stage during the piston run. This ability to measure the axial piston position continuously is important as it enables the proving stroke to be defined by pulses from the meter undergoing proving. The proving stroke can thus be selected to occupy a whole number of meter revolutions, eliminating errors that would arise from cyclic variations in the meter.

Figure 7:
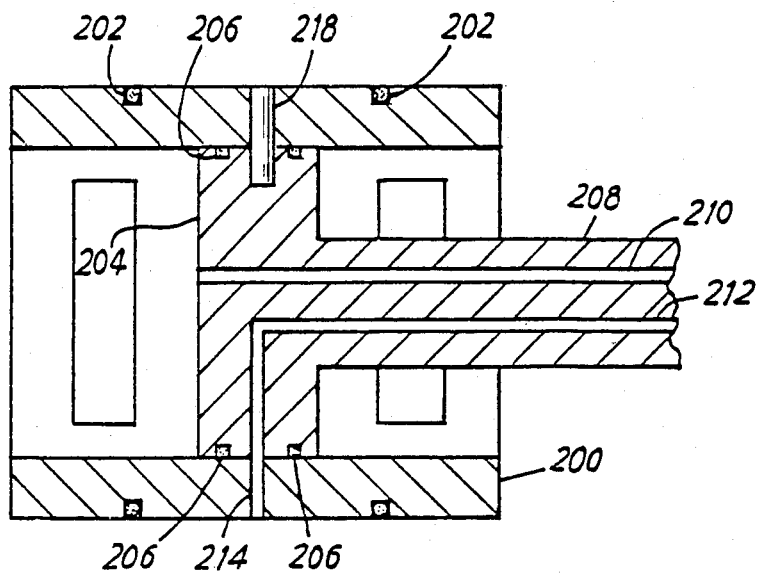
FIG. 7 is a sectional view showing an alternative form of piston for use in the prover shown in FIG. 1.

A modified form of piston for use in the above described meter prover is illustrated in FIG. 7. The piston comprises an annular wall portion 200 formed with spaced outer O-ring seals 202. Centrally within the piston, there is mounted an inner disc member 204 with sealing engagement between the disc member and the wall portion being ensured by a pair of inner O-ring seals 206. The disc member 204 is formed integrally with the piston rod 208 and channels 210, 212 cut in the rod and disc member communicate with the proving bore and—through a registering passage 214 in the wall portion—with the volume between the outer O-ring seals 216. These passages enable block and bleed monitoring of possible leakage past the outer O-ring seals 202 in the manner described above as well as past the inner O-ring seals 206.

The disc member is secured to the piston wall by means of radially disposed shear pins 218. It will be appreciated that in normal use the piston will function as an integral structure. However, in the event of the piston jamming within the proving bore, fluid forces acting on the disc member 204 will cause the shear pins to fracture so enabling the disc member, and integral piston rod, to separate axially from the jammed cylinder and continue along the bore with the fluid flow. In this condition, fluid can pass freely through the cylinder and around the displaced disc member. The cross-sectional area of the relief passage created in this manner should ideally be no less than the cross-sectional area of the pipe work leading to the meter prover.

In a further modification, the dividing line between the inner and outer radial parts of the piston takes the form not of a cylinder but a frusto-conical surface. The cone angle being such as to permit downstream movement of the piston rod relative to the remainder of the piston. In yet a further modification, the radially disposed shear pins can be replaced by a solid shear ring of toroidal form, the shear ring then functioning both as a seal and as an overload protection device. Alternatively, the shear ring may be replaced by an inflatable ring the material and inflation pressure of which are chosen so that the ring will burst at the maximum safe fluid pressure within the proving bore. The time taken for the ring to burst at the threshold can be reduced by the provision of a cutting ring or by the use of a plunger valve formed with a needle point.

In a further modification of the described meter prover, the piston rod is secured to the piston not directly but through a flexible coupling comprising, for example, a block of elastomeric material. By this expedient, slight movement of the piston relative to the piston rod can be accommodated to prevent jamming.

In a further modification, the linear measurement device comprising a transducer on the piston rod end cooperable with a fixed tape, is replaced by a fixed scale disposed coaxially of the proving bore and cooperable with a transducer mounted on the piston itself. With such an arrangement it is possible for the rigid piston rod to be replaced by bellows type or telescopic piston extension means extending from the upstream face of the piston to the corresponding end of the proving bore. In this way, it is ensured that the effective area of the upstream piston face is less than that of the downstream face so that the above described automatic retraction of the piston is still achieved. By "effective area" is meant the component of area normal to the direction of movement of the piston.

Figure 8:
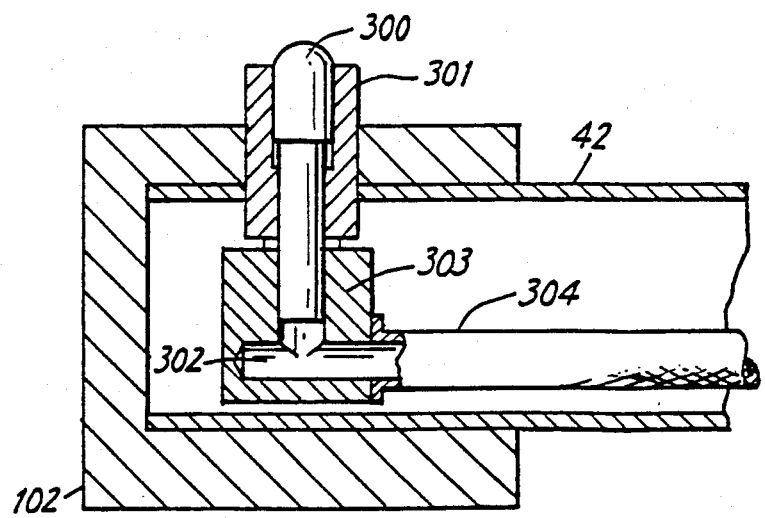
FIG. 8 is a detail view showing a further modification.

A further modification is illustrated in FIG. 8. If the excess pressure created in the above described block and bleed arrangement is felt to be insufficient, a plunger 300 can be slidably mounted in a sleeve 301 projecting from the carriage 102. This plunger is depressed at the start of the proving stroke through cooperation with a cam surface on, for example, the underside of the nudge cylinder mounting bar. A pressure surge is developed in chamber 302 of a cylinder block 303; which surge is communicated to the volume between the piston seals, along tubing 304.

In other modifications, the proving bore is established by a structure other than the described arrangement of a right proving cylinder and a coaxial outer shell; the proving bore may for example be formed in a block of rectangular or other non-cylindrical external shape. It has been explained that there may be advantage in having a piston in radially inner and outer parts which are separable in the event of jamming of the piston. There may be advantage, for other reasons, in having a piston in two axial parts. Thus, maintenance of the piston sealing rings would be facilitated.

It will be apparent to the skilled man that still further modifications to the described embodiments can be made without departing from the scope of this invention as set forth in the accompanying claims.

We claim:

1. In a meter prover for proving a meter connected in a fluid flow path where the meter prover is of the type having
   (a) means providing a proving bore;
   (b) a piston disposed in the proving bore and movable along said bore in sealed engagement with the wall of the bore, said piston starting its proving run from an initial upstream position;
   (c) means for connecting the proving bore in parallel with a section of the flow path not containing the meter; and
   (d) by pass valve means operable to cause fluid flow selectively through the proving bore or through said parallel flow path section;
   whereby in a proving run, the piston moves axially in synchronism with fluid flow along the proving bore and displaces a known volume within the bore, the improvement wherein
   the effective area of the upstream face of the piston acted on by fluid pressure is less than the effective area of the piston's downstream face acted on by fluid pressure so that on reestablishment of flow through said parallel flow path section after a proving run, substantially equal fluid pressures act on said faces of the piston, whereby the difference in effective area of those faces causes the piston to be restored to its initial upstream position.

2. The improvement according to claim 1, wherein the proving bore is terminated at its upstream end by an end wall,
   and the improvement further includes
   piston extension means extending from the upstream face of the piston to the upstream end wall of the proving bore.

3. The improvement according to claim 2, wherein said extension means comprises a rigid piston rod attached to the piston and extending through the upstream end wall of the proving bore.

4. The improvement according to claim 3, further including length transducer means carried by said piston rod, and a scale fixed in position relative to said piston rod and cooperable with said length transducer means for enabling determination of the axial position of the piston in the proving bore.

5. The improvement according to claim 1, wherein
said proving bore is embodied in a proving cylinder and the improvement further includes
a hollow cylindrical shell surrounding the proving cylinder, the cylinder and shell being interconnected only at the axial ends of the proving bore.

6. The improvement according to claim 5, wherein
the proving cylinder has a fluid inlet and a fluid outlet adjacent respective opposite ends of that cylinder, and the shell has a fluid inlet adjacent its end which is remote from the cylinder fluid inlet, whereby fluid flow through the prover passes along an annular gap between the shell and the cylinder before entering the proving bore.

7. The improvement according to claim 1, wherein
the proving bore is embodied in a hollow cylinder having a chamber at its downstream end whose diameter exceeds that of the bore, and
the piston has an axial length exceeding that of the chamber and is provided with passage means enabling flow through the piston between the chamber and the bore when the piston is in a position where it extends across the chamber.

8. The improvement according to claim 7, wherein
the piston has an annular wall that is coaxial with the bore and the annular wall has at least one passage which enables flow through the piston between the chamber and the bore when the piston's annular wall extends across the chamber.

9. The improvement according to claim 1, wherein
the piston comprises radially inner and outer parts which are separable in the axial direction, and
the improvement further comprises
restraining means for restraining separation of those parts, the restraining means enabling those parts to separate where the fluid forces on the piston exceed a predetermined threshold.

* * * * *